Dec. 5, 1933.  W. W. HINSON  1,938,254

CLEANING PAN

Filed May 23, 1932

Inventor

W. W. Hinson.

By Lacey & Lacey, Attorneys

Patented Dec. 5, 1933

1,938,254

UNITED STATES PATENT OFFICE 1,938,254

CLEANING PAN

Walter W. Hinson, Kansas City, Mo.

Application May 23, 1932. Serial No. 613,039

4 Claims. (Cl. 141—1)

This invention relates to cleaning pans and has for an object to provide a simple and efficient device in which tools, machine parts and many other articles may be rapidly cleaned by the application of a cleaning fluid such as gasoline, or other suitable medium, the gasoline bath floating on water so that a minimum amount of such cleaning fluid is used.

A further object is to provide a cleaning pan having a screen suitably mounted parallel with the bottom of the pan for supporting the articles to be cleaned and permitting the sediment to gravitate to the bottom of the pan.

A further object is to provide a cleaning pan having a drain pipe for the cleaning fluid and having a drain pipe for the water, the water drain pipe extending into the pan below the screen to drain the water space and keep the water level below the screen as the bottom of the pan fills with dirt.

A further object is to provide a device of this character which will be formed of a few strong, simple and durable parts which may be manufactured at minimum expense, and which will not easily get out of order.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

In the accompanying drawing forming part of this specification,

Figure 1:
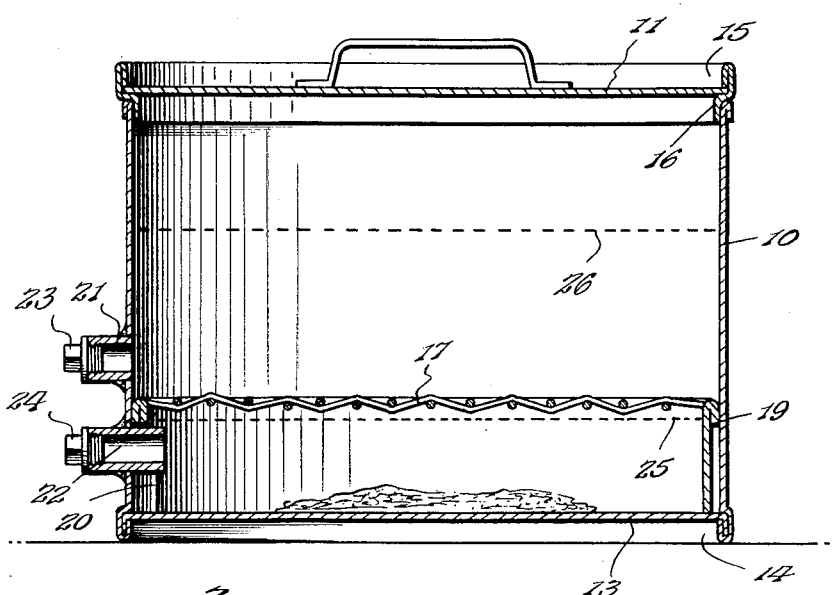
Figure 1 is a vertical section through the device.

Referring now to the drawing in which like characters of reference designate similar parts in the various views, 10 designates a sheet metal tub, tank, or pan which may be of any desired dimensions, and 11 designates a cover for the pan. Preferably the bottom 13 of the pan is elevated above the floor or other support by means of an annular flange 14 formed, for instance, by crimping the lower edge of the wall of the pan around the down-turned marginal edge of the bottom. The cover may be formed of a single blank of sheet metal looped at the edge to provide an upstanding flange 15 and thence bent inwardly and directed downwardly to provide a supporting flange 16 which enters the rim of the pan, as shown.

Figure 2:
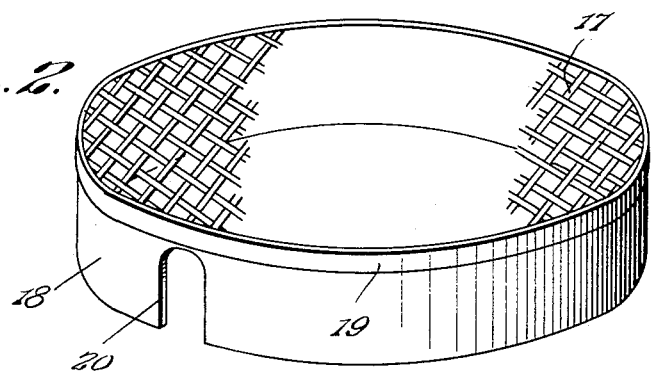
Figure 2 is a perspective view of the screen and its support.

Disposed in the pan is a wire mesh screen 17 which is of sufficient diameter to extend substantially to the wall of the pan. The screen is preferably provided with a sheet metal supporting ring 18 which preferably is of equal height throughout so as to support the screen 17 parallel with the pan bottom. The ring is provided with a flange 19 at the top to reinforce and stiffen the top to withstand distortion. An opening 20 is formed in the ring, as best shown in Figure 2. The screen may be further reinforced to resist distortion, as will be later described.

The pan 10 is provided with superposed drain pipes 21 and 22 that are closed by threaded plugs 23 and 24, respectively. The lower drain pipe is of sufficient length to pass through the opening 20 in the ring 18 and extend beneath the screen 17, while the upper drain pipe terminates flush with the wall of the pan and is disposed slightly above the screen as shown.

In operation the pan 10 will function best with the water level ½" to ¾" below the screen 17, the water level being indicated at 25. Now gasoline or other suitable cleaning fluid is poured in on top of the water, the gasoline level being indicated at 26. Automobile parts, tools, machinery, textiles, or other material to be washed may now be dropped into the gasoline bath 26 and either agitated manually or placed upon the screen 17. All dirt, sediment and the like will gravitate through the screen unless too large to go through or to light to sink. The dirt and sediment are thus segregated and kept segregated from the cleaning fluid so that the cleaning fluid is maintained in a clean condition throughout the washing operation.

Figure 3:
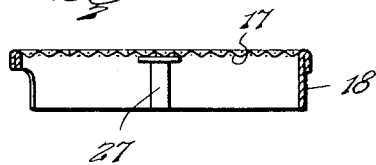
Figure 3 is a detail section showing a post reinforcement for the screen.
Figure 4:
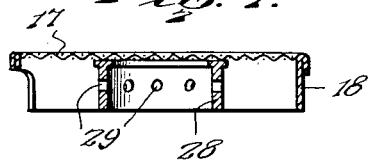
Figure 4 is a detail section showing a perforated ring reinforcement for the screen.

After the cleaning operation, the gasoline may be drained through the drain pipe 21 and saved for further use if it is clean enough. The water may be drained through the drain pipe 22. The screen may now be removed by simply lifting same vertically from the pan whereupon the dirt, sediment and other impurities may be removed from the bottom of the pan. As shown in Figure 3, a post 27, or a plurality of posts, may be mounted below the screen 17 to prevent the screen being distorted by the weight of the parts being cleaned. As shown in Figure 4, a center ring 28, or a plurality of rings, may be substituted for the posts to accomplish the same result. The ring is provided with perforations 29 to permit water and sediment passing therethrough.

It will be seen that by virtue of floating the cleaning fluid on water a minimum amount of the cleaning fluid will be used. It will further be noted that by extending the water drain pipe 22 through the ring 18, the water can be readily drained from the bottom of the pan which would not be the case were the opening 20 dispensed with and the drain pipe terminated flush with the wall of the tank because in such event the ring 18 might shift and block the drain pipe, as will readily be understood.

From the above description it is thought that the construction and operation of this invention will be fully understood without further explanation.

What is claimed is:

1. In a cleaning device, a pan, a removable screen therein having a downwardly extending marginal flange supported upon the bottom of the pan and of substantially the same diameter as the pan, said screen dividing the pan into a water space below the screen and a cleaning fluid space above the screen, and drain pipes in the wall of the pan for draining both of said spaces and maintaining the water level below the screen.

2. A cleaning device comprising a pan, a cover therefor, superposed drain pipes in the wall of the pan, the upper drain pipe terminating flush with the wall of the pan and the lower drain pipe extending inwardly considerably beyond said wall, and a screen in said pan extending parallel with the bottom thereof and disposed substantially midway between both of said pipes, said screen including a wire mesh top and a support below the top, said support being provided with an opening to receive the lowermost drain pipe.

3. A cleaning device comprising a cylindrical pan, superposed drain pipes in the wall of the pan, the lowermost drain pipe extending inwardly beyond said wall, a wire mesh screen in the pan between the drain pipes, an annular sheet metal ring depending from the edge of said screen and disposed in close proximity to the wall of the pan, said ring being provided in one side with an arched opening receiving the projecting end of said lowermost drain pipe, and closures for both drain pipes.

4. A cleaning device comprising a pan, a wire mesh screen in the pan, a sheet metal supporting ring for the screen, means in the pan adapted to stiffen and reinforce the screen against distortion, and drain pipes disposed at different levels in the wall of the pan, one of the drain pipes extending into the pan underneath the screen.

WALTER W. HINSON. [L. S.]